(12) United States Patent
Wiegers

(10) Patent No.: US 8,041,029 B2
(45) Date of Patent: Oct. 18, 2011

(54) MOUNT FOR AN ELECTRONIC DEVICE

(75) Inventor: Michael R. Wiegers, Baldwin City, KS (US)

(73) Assignee: Garmin Switzerland GmbH (CH)

( * ) Notice: Subject to any disclaimer, the term of this patent is extended or adjusted under 35 U.S.C. 154(b) by 328 days.

(21) Appl. No.: 12/364,016

(22) Filed: Feb. 2, 2009

(65) Prior Publication Data

US 2010/0193649 A1 Aug. 5, 2010

(51) Int. Cl.
*H04M 1/00* (2006.01)

(52) U.S. Cl. ........ 379/455; 379/454; 379/446; 455/573; 455/575.1; 455/575.9; 248/346.03

(58) Field of Classification Search .............. 248/183.1, 248/188.8, 288.31, 371, 346.01, 346.03, 248/346.06, 346.07; 379/455, 454, 446; 455/573, 575.1, 575.9

See application file for complete search history.

(56) References Cited

U.S. PATENT DOCUMENTS

| | | | | |
|---|---|---|---|---|
| 5,392,350 A * | 2/1995 | Swanson | ........................ | 379/446 |
| 5,396,408 A | 3/1995 | Szczech, III | .................. | 362/397 |
| 6,129,321 A | 10/2000 | Minelli et al. | .............. | 248/183.1 |
| 6,173,933 B1 | 1/2001 | Whiteside et al. | ......... | 248/276.1 |
| 6,439,530 B1 * | 8/2002 | Schoenfish et al. | ...... | 248/346.06 |
| 6,840,487 B2 * | 1/2005 | Carnevali | ................. | 248/346.06 |
| 6,870,089 B1 | 3/2005 | Gray | .............................. | 136/251 |
| 7,403,613 B2 * | 7/2008 | Liou | .............................. | 379/455 |
| 7,690,614 B1 * | 4/2010 | Mudd et al. | .............. | 248/346.06 |
| 2003/0096642 A1 | 5/2003 | Bessa et al. | .................... | 455/573 |
| 2004/0145457 A1 | 7/2004 | Schofield et al. | .......... | 340/425.5 |
| 2008/0011917 A1 | 1/2008 | Adams | .......................... | 248/205.5 |
| 2008/0092941 A1 * | 4/2008 | Kuo | ........................... | 136/248 |

OTHER PUBLICATIONS

U.S. Appl. No. 10/950,857 entitled Friction Mount Apparatus for an Electronic Device, filed Sep. 27, 2004.
Application U.S. Appl. No. 12/335,038, filed Dec. 15, 2008.
Solio Solar Charger for iPod, cellphone, GPS, PDA; printout from http://store.sundancesolar.com/soposochfori.html, published prior to Jan. 27, 2009.

* cited by examiner

*Primary Examiner* — Terrell Mckinnon
*Assistant Examiner* — Todd M. Epps
(74) *Attorney, Agent, or Firm* — Samuel M. Korte

(57) ABSTRACT

A mounting device comprises a base for placement on a vehicle dashboard or other surface; an attachment mechanism positioned on the base for removably coupling with the electronic device; a battery system including a rechargeable battery positioned within the base or the attachment mechanism for providing power to the electronic device when it is coupled to the attachment mechanism; and at least one solar cell positioned on or incorporated into the base or the attachment mechanism for charging the rechargeable battery.

16 Claims, 3 Drawing Sheets

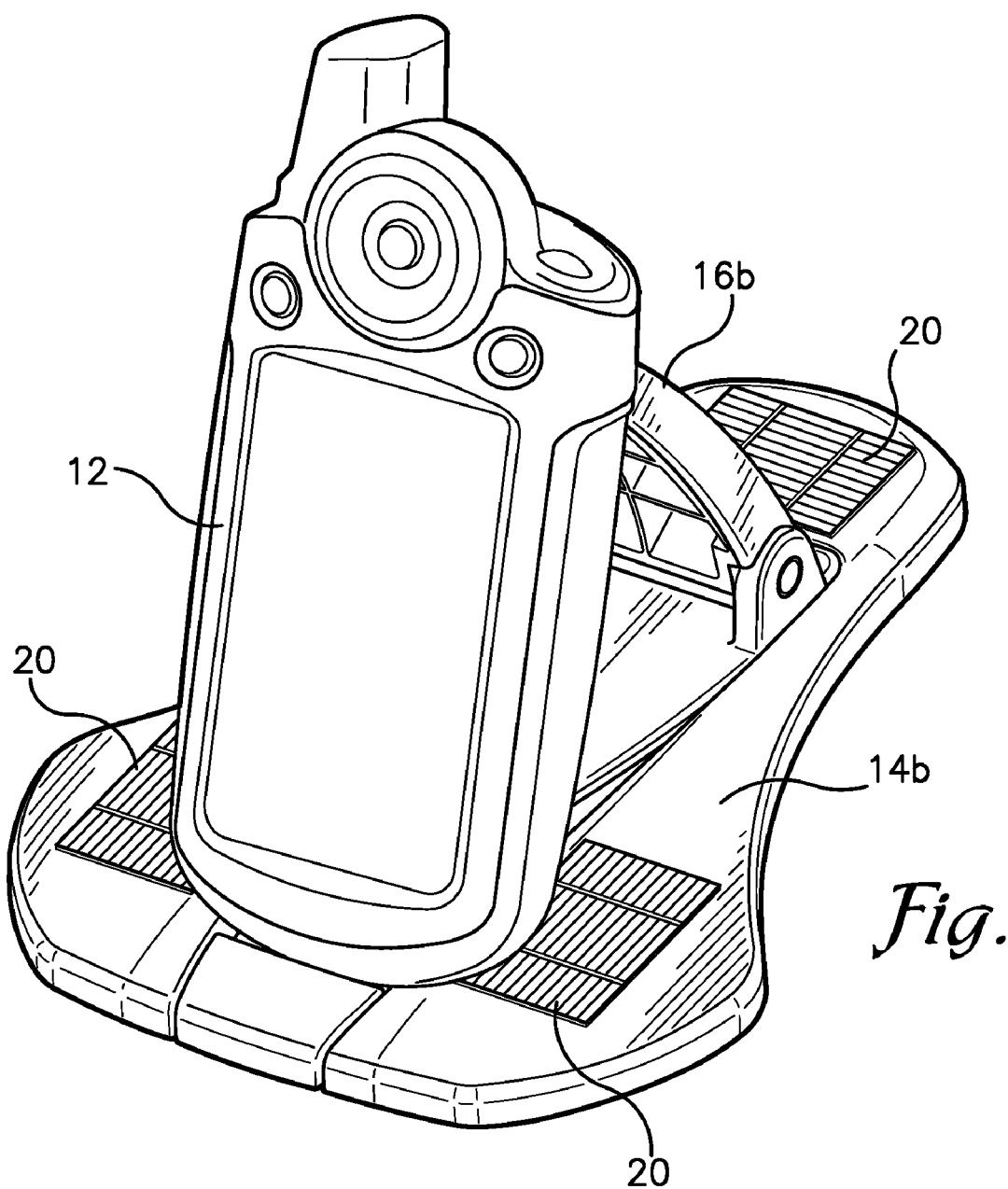

MOUNT FOR AN ELECTRONIC DEVICE

BACKGROUND

It is often desirable to removably mount portable electronic devices within vehicles so the devices can be used inside or outside the vehicles. For example, many people prefer to use portable navigation devices in their vehicles rather than buying vehicles equipped with permanent dash-mounted navigation devices. Many different mounting devices have been created to securely, but removably, position portable navigation devices in vehicles.

Unfortunately, portable electronic devices cannot be easily wired to a vehicle's battery and electrical system and therefore must either be frequently removed for recharging or charged with potentially cumbersome cigarette lighter adapters or other charging cables. Attempts have been made to incorporate a solar cell into an electronic device or into a suction cup mount for the electronic device. Because suction cup mounts can only be attached to relatively hard, smooth surfaces such as glass windshields, they have only a limited surface area for solar cell attachment, can only orient their attached solar cells in limited directions, and cannot be easily moved. This reduces their solar collecting capabilities. Incorporating solar cells into electronic devices is generally undesirable due to cost, complexity, and size concerns.

SUMMARY

Embodiments of the present invention solve the above-described problems and provide a distinct advance in the art of electronic device mounts by providing a mount with attached or embedded solar cells that securely supports an electronic device on a surface and that can be easily moved, repositioned, or otherwise oriented to maximize solar exposure.

One embodiment of the mounting device comprises a base for placement on a vehicle dashboard or other surface in a vehicle; an attachment mechanism positioned on top the base for removably coupling with the electronic device; a battery system including a rechargeable battery positioned within the base or the attachment mechanism for providing power to the electronic device when it is coupled to the attachment mechanism; and at least one solar cell positioned on or incorporated into the base or the attachment mechanism for charging the rechargeable battery and/or directly powering the electronic device.

In a particular embodiment of the mounting device, the base comprises a flexible outer shell filled with pellets, rocks, or other weights. The rechargeable battery may be positioned within the base, and the solar cells may be attached to or embedded in a top surface of the base. This type of base securely supports the electronic device to a vehicle dash or other mounting surface and is easily moved and highly flexible so it can be located, shaped, or otherwise oriented to position the solar cells for maximum solar exposure.

In another particular embodiment of the mounting device, the base comprises a flexible bendable insert sandwiched between top and bottom covers. Again, the rechargeable battery may be positioned within the base, and the solar cells may be attached to or embedded in the top surface of the base. This type of a base also securely supports the electronic device to a vehicle dash or other mounting surface and is easily moved and highly flexible so it can be located, shaped, or otherwise oriented to position the solar cells for maximum solar exposure.

In other embodiments, the solar cells may be moveable relative to the base so that they can be oriented for maximum solar exposure. For example, the solar cells may be hingedly and/or pivotally attached to the base so that one end of the solar cells can be selectively and incrementally raised, tilted, and/or canted to face sunlight.

This summary is provided to introduce a selection of concepts in a simplified form that are further described below in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with referenced to the attached drawing figures, wherein.

Figure 4:
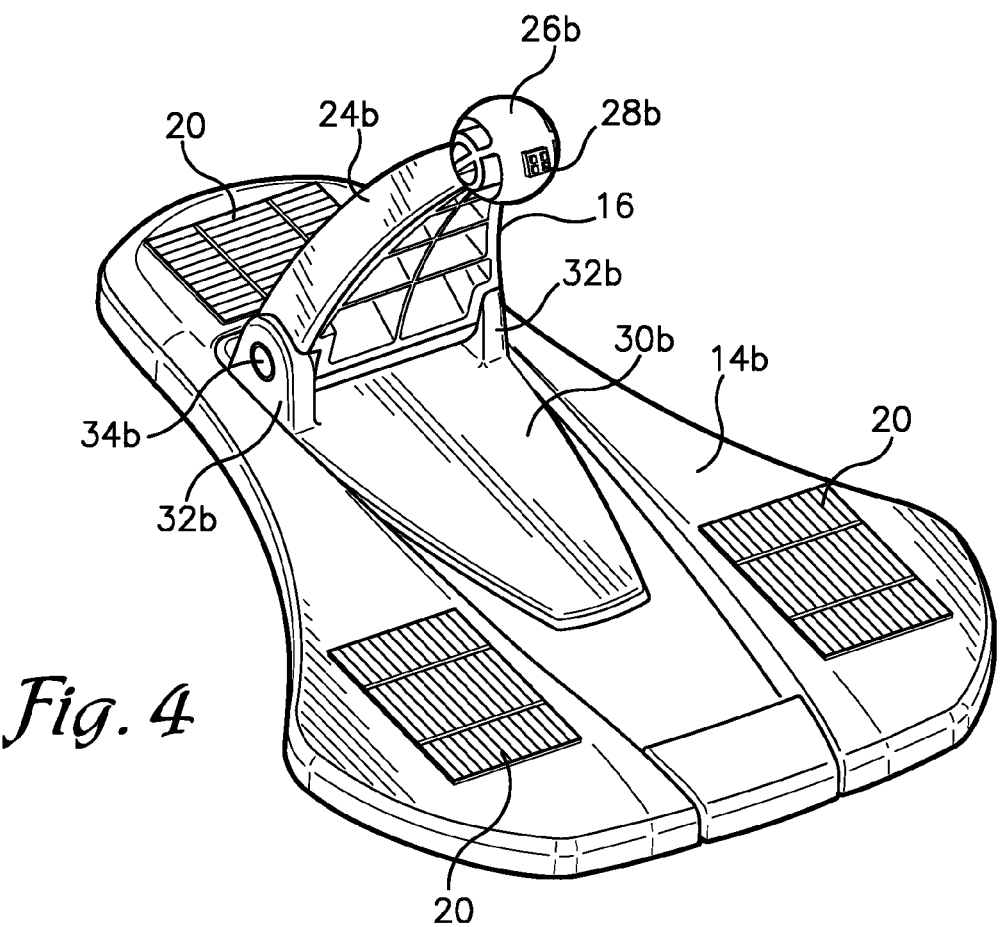

FIG. 4 is an isometric view of a mounting device constructed in accordance with another particular embodiment of the invention; and FIG. 5 is an isometric view of the mounting device of FIG. 4 with an exemplary electronic device attached thereto The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
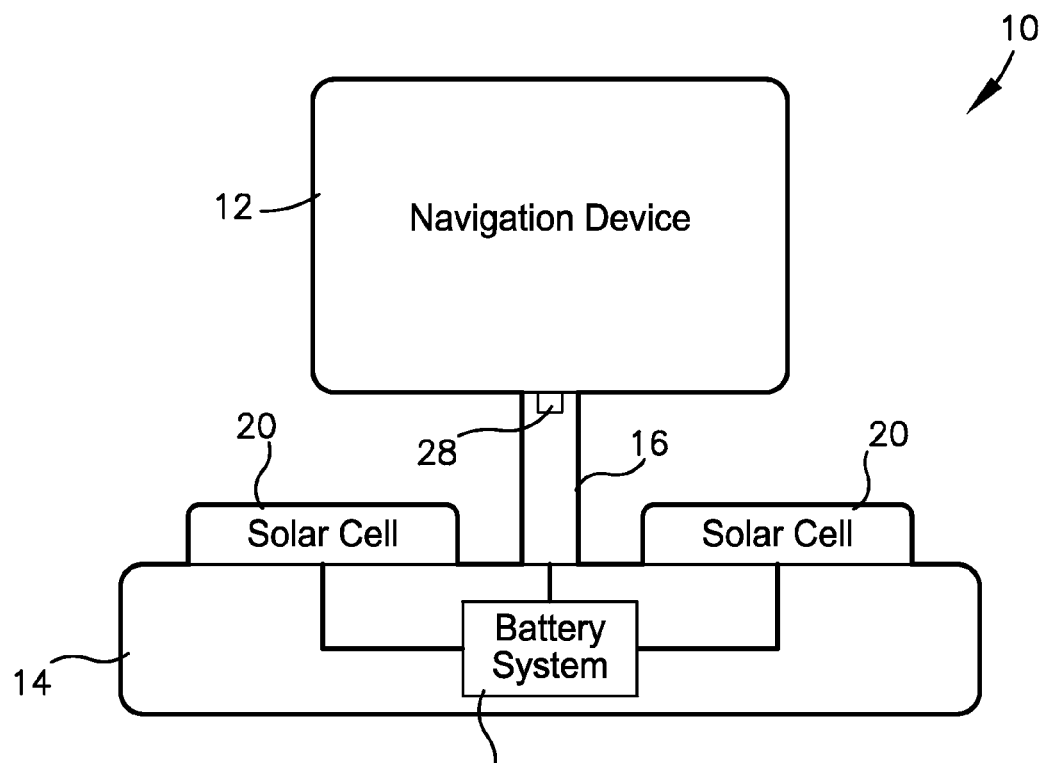
FIG. 1 is a schematic diagram of a mounting device constructed in accordance with various embodiments of the invention.

Turning now to the drawing figures, and initially FIG. 1, a mounting device broadly referred to by the numeral 10 and constructed in accordance with various embodiments of the invention is schematically illustrated. The mounting device 10 is configured for removably securing an electronic device 12, such as a personal navigation device, navigation-enabled mobile phone, personal digital assistant, MP3 player, electronic game player, or any other device to a mounting surface such as a vehicle dash, center console, seat, or rear window sill. Various embodiments of the mounting device 10 broadly comprise a base 14 for placement on the mounting surface; an attachment mechanism 16 positioned on top the base 14 for removably coupling with the electronic device 12; a battery system 18, including a rechargeable battery and associated charging and control circuitry, positioned within the base 14 or the attachment mechanism 16, for providing power to the electronic device 12 when it is coupled to the attachment mechanism 16; and at least one solar cell 20 positioned on or incorporated into the base 14 or the attachment mechanism 16 for charging the rechargeable battery. The mounting device 10 and its constituent components illustrated and described herein are merely embodiments of the invention and may be replaced with other embodiments without departing from the scope of the claims.

Figure 2:
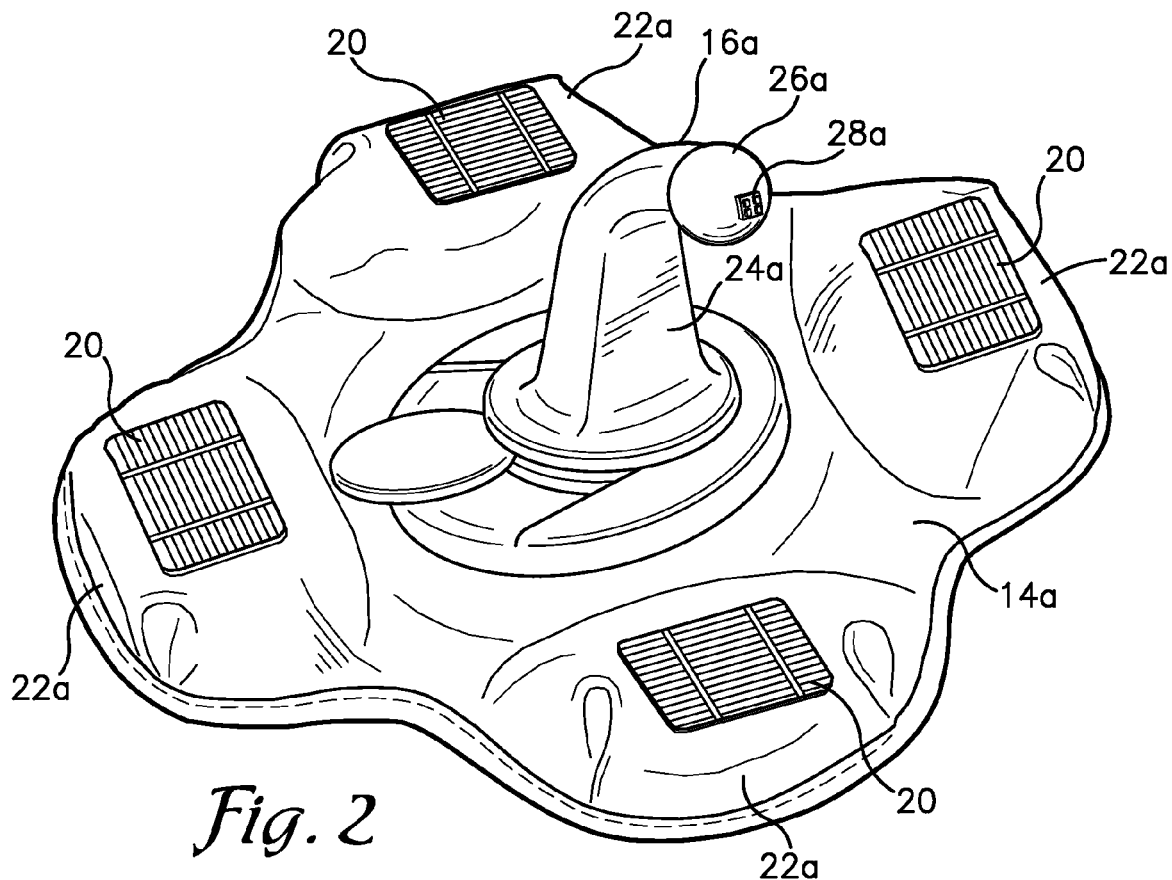
FIG. 2 is an isometric view of a mounting device constructed in accordance with a particular embodiment of the invention.
Figure 3:
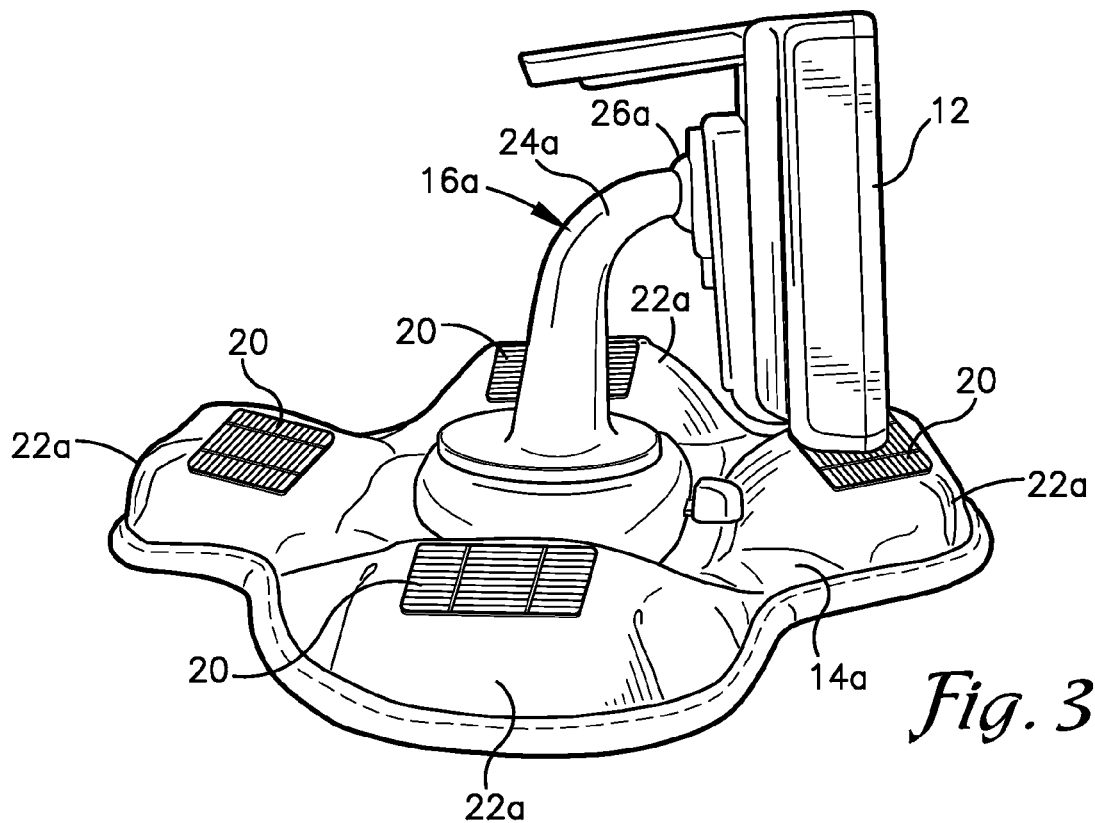
FIG. 3 is an isometric view of the mounting device of FIG. 2 with an exemplary electronic device attached thereto.

The base 14 and attachment mechanism 16 shown schematically in FIG. 1 may be constructed in accordance with various different embodiments, one of which is illustrated in FIGS. 2 and 3. The base 14 can be removably positioned on the mounting surface and maintain its position on the surface primarily using frictional forces. That is, the base 14, due to its size, shape, and/or mass, can hold its position on the surface during expected driving conditions primarily using forces related to friction between the surface and the base 14 instead of fastening elements such as adhesives, screws, suction cups, hook and loop fasteners, and the like. The use of frictional forces to hold the base 14 to the mounting surface allows users to easily and rapidly position the base 14 on the desired mounting surface. In some embodiments, the bottom portion of the base 14 may include a friction-increasing material, including adhesives, to supplement the holding power of the base 14.

In some embodiments, the base 14a comprises a flexible outer shell filled with pellets, rocks, or other weights. The shell may be formed of vinyl, leather, fabric, or any other suitable material and may be stitched or otherwise fastened to form a number of independently shiftable appendages 22a that can be individually and/or collectively positioned to conform to the contours of the mounting surface. This permits the base to securely support the attachment mechanism 16a and the electronic device 12 attached thereto to nearly any mounting surface, including soft surfaces unsuitable for a suction cup mount. Moreover, the construction and configuration of the base 14a makes it easy to move and orient so that it can be located, shaped, reconfigured, or otherwise oriented to position the solar cells 20 for maximum solar exposure as discussed in more detail below.

The attachment mechanism 16a removably supports the electronic device 12 to the base 14a as shown in FIG. 3 and may comprise a mounting arm or post 24a with a ball joint 26a on the distal end thereof for receipt within a corresponding ball-type socket positioned on the electronic device or on a socket assembly associated with the electronic device. Returning to FIG. 2, the mounting device may also include an electrical connector 28a positioned on or in the ball joint 26a for coupling with a corresponding electrical connector on the electronic device 12 and/or socket assembly for providing power to the electronic device. In some embodiments, the electrical connector 28a is not associated with the ball joint 26a and instead is a cable that separately extends from the battery system 18 to the electronic device 12. The electrical connector may be a USB connector or any other connector or device capable of providing electrical power to the electronic device. Various other exemplary aspects of the base 14a and attachment mechanism 16a are described in more detail in U.S. Pat. No. 6,439,530, which is hereby incorporated by reference into the present application in its entirety.

Other embodiments of the base 14 and attachment mechanism 16 from FIG. 1 are shown in FIGS. 4 and 5. In this embodiment, the base 14b comprises a flexible bendable metal insert sandwiched between top and bottom covers. This type of a base also securely supports the electronic device to nearly any mounting surface and is easily moved and highly flexible so that it can be located, shaped, or otherwise oriented to position the solar cells for maximum solar exposure.

The lower surface or cover of the base 14b may be at least partially formed of a material that provides sufficient friction between its lower surface and the dashboard or other mounting surface to resist unwanted movement. In one embodiment, the lower surface is formed of a non-skid polymer material such as rubber, neoprene, silicone, or Sorbothane®.

One embodiment of the attachment mechanism 16b includes a mounting arm or post 24b hingedly coupled to a hinge anchor 30b that is positioned within the top cover plate of the base 14b. The hinge anchor 30b includes a pair of spaced-apart upstanding hinge pin supports 32b with axially aligned pin holes for receiving a hinge pin 34b. One end of the mounting arm 24b is configured for placement between the pin supports 32b and includes a pin hole through which the hinge pin 34b extends. The distal end of the mounting arm 24b may include a ball joint 26b for receipt within a corresponding ball-type socket positioned on the electronic device and/or a socket assembly associated with the electronic device.

Referring to FIG. 4, the mounting device may also include an electrical connector 28b positioned on or in the ball mount 26b for coupling with a corresponding electrical connector on the electronic device and/or socket assembly for providing power to the electronic device. However, the electrical connector may be a USB connector or any other connector or device capable of providing electrical power to the electronic device.

In some embodiments, the mounting arm 24b can be pivoted about the hinge pin 34b to raise or lower the attached electronic device 12 relative to the base 14b. The electronic device 12 may also be swiveled about the ball joint 26b to tilt and/or cant the electronic device to a desired viewing angle. Other exemplary aspects of the base 14b and attachment mechanism 16b are described in more detail in commonly-owned U.S. patent application Ser. No. 12/335,038, which is hereby incorporated by reference into the present application in its entirety.

In some embodiments, the attachment mechanism 16 and/or 16b may employ elements other than the mounting arm 24b. For example, the attachment mechanism 16b may include fixed (e.g., non-pivotable) mounting elements and/or mounting surfaces such as a flat plastic disk. The mounting surface provides an attachment location for conventional electronic device mounts such as suction cup mounts. Thus, a user may secure the electronic device to the attachment mechanism 16 by attaching a suction cup mount, or any other conventional electronic device mount, to the mounting surface. The attachment mechanism 16 may additionally or alternatively include hook-and-loop fastener elements (e.g., VELCRO), magnetic attachment elements, and/or a cavity for securely receiving a portion of the electronic device 12. For example, in some embodiments, the mounting device 10 may present a bean-bag like configuration where the attachment mechanism 16 is a volume of the mounting device 10 that may be compressed, deformed, or otherwise deflated to hold the electronic device 12.

The battery system 18 may be positioned within the base 14 as shown in FIG. 1, within the attachment mechanism 16, and/or externally coupled thereto. The battery associated with the battery system 18 may be any type of energy storage device such as a lithium battery, atomic battery, or alkaline battery. In a particular embodiment, the battery is a rechargeable 3.6V 1600 mAh lithium ion battery. The battery system 18 includes battery charging circuitry and battery discharge circuitry to facilitate use of the rechargeable battery. In some embodiments, the mounting device 10 lacks the battery system 18 and instead directly powers the electronic device 12 from the solar cells 20. However, utilization of the battery system 18 may be desirable in some embodiments as the battery may be charged independently of the electronic device 12. For example, a user could leave the mounting device 10 on the dash of his or her vehicle while the user is shopping to charge the battery, even when the electronic device 12 is not mounted to the mounting device 10, and then later power the device 12 using the battery system 18 when solar collection is limited (e.g., at night). Utilization of the battery system 18 also enables the mounting device 10 to be easily transferred between different vehicles without hassling with the power cables that may be associated with the electronic device 12.

The solar cells 20 may be any solar transducer device capable of converting solar energy into electricity such as monocrystalline, polycrystalline, or amorphous type solar cells. In one embodiment, the plurality of solar cells 20 has an output of approximately 155 mA at 6V. In some embodiments, each solar cell 20 provides an output of approximately 0.5V.

The mounting device 10 preferably includes several solar cells 20 to provide maximum solar charging and to permit optimal positioning of the mounting device to achieve maximum solar exposure as described below. For example, the embodiment of the mounting device illustrated in FIGS. 2 and 3 includes four or more solar cells and the embodiment of the mounting device illustrated in FIGS. 4 and 5 includes three or more solar cells, but any number of solar cells may be provided.

The solar cells 20 may be attached to or embedded in either the base 14 and/or the attachment mechanism 16. For example, in the embodiments of FIGS. 2-5, the solar cells 20 are attached to a top surface of the bases 14a, 14b. Because the various embodiments of the bases 14a, 14b are flexible and easy to move, the bases 14a, 14b and the attached solar cells 20 can be quickly and easily positioned or oriented for maximum solar exposure. For example, if the vehicle in which the electronic device 12 is pointed toward direct sunlight, the base 14a, 14b may be positioned so that at least several of the attached solar cells 20 are positioned directly under the vehicle's windshield. However, if the vehicle is pointed away from direct sunlight or at an angle to the sun, the base 14a, 14b may be moved to a center console, a seat, near a door/window, or to the rear window sill of the vehicle for maximum solar exposure.

In other embodiments, the solar cells may be moveable relative to the base 14a, 14b so that they can be oriented for maximum solar exposure. For example, the solar cells may be hingedly and/or pivotally attached to the base 14a, 14b so that one end of the solar cells can be selectively and incrementally raised, tilted, and/or canted to face sunlight.

Moreover, instead of being distinct and separate components as illustrated in FIGS. 2-5, the solar cells 20 may be integrally formed as a part of the base 14a, 14b or attachment mechanism 16a, 16b. For example, the solar cells 20 may be constructed of conductive or semi-conductive layers, films, or regions of the base 14a, 14b or attachment mechanism 16a, 16b that together form a solar cell.

The mounting device 10 may also include additional connectors for coupling with a cigarette lighter adapter or 120V AC adapter for recharging the battery and/or powering the attached electronic device 12 at night or other times when the mounting device is not exposed to sufficient sunlight to charge the battery.

Although the invention has been described with reference to the embodiments illustrated in the attached drawing figures, it is noted that equivalents may be employed and substitutions made herein without departing from the scope of the invention as recited in the claims. For example, the mounting device 10 may be constructed of materials and in shapes and sizes other than those described and illustrated herein.

Having thus described various embodiments of the invention, what is claimed as new and desired to be protected by Letters Patent includes the following:

1. A mounting device for supporting an electronic device on a surface, the mounting device comprising:
    a flexible base that can be removably positioned on the surface and maintain its position on the surface primarily using frictional forces;
    an attachment mechanism positioned on the base for removably coupling with the electronic device;
    a battery system including a rechargeable battery for providing power to the electronic device when the electronic device is coupled to the attachment mechanism; and
    at least one solar cell positioned on or incorporated into the base or the attachment mechanism for charging the rechargeable battery.

2. The mounting device as set forth in claim 1, the base comprising an outer shell filled with weights.

3. The mounting device as set forth in claim 1, wherein the attachment mechanism includes a hinge anchor and a mounting arm hingedly coupled with the hinge anchor.

4. The mounting device as set forth in claim 3, wherein a distal end of the mounting arm includes a ball mount for receipt within a corresponding socket on the electronic device or a socket assembly associated with the electronic device.

5. The mounting device as set forth in claim 4, further including an electrical connector positioned on or in the ball mount for connecting to a corresponding connector on the electronic device or the socket assembly when the electronic device is coupled to the attachment mechanism, the electrical connector being electrically coupled with the battery system for providing power to the electronic device.

6. The mounting device as set forth in claim 1, wherein mounting device includes a plurality of solar cells.

7. A mounting device for removably supporting an electronic device on a surface, the mounting device comprising:
    a base for placement on the surface, the base including at least two independently moveable appendages, wherein the base is operable to maintain its position on the surface primarily using frictional forces;
    an attachment mechanism positioned on top the base for removably coupling with the electronic device;
    a battery system including a rechargeable battery positioned within the base or the attachment mechanism for providing power to the electronic device when the electronic device is coupled to the attachment mechanism; and
    at least two solar cells positioned on or incorporated into the appendages of the base for charging the rechargeable battery.

8. The mounting device as set forth in claim 7, the base comprising an outer shell filled with weights.

9. The mounting device as set forth in claim 7, wherein the attachment mechanism includes a hinge anchor and a mounting arm hingedly coupled with the hinge anchor.

10. The mounting device as set forth in claim 9, wherein a distal end of the mounting arm includes a ball mount for receipt within a corresponding socket on the electronic device or a socket assembly associated with the electronic device.

11. The mounting device as set forth in claim 10, further including an electrical connector positioned on or in the ball mount for connecting to a corresponding connector on the electronic device or the socket assembly when the electronic device is coupled to the attachment mechanism, the electrical connector being electrically coupled with the battery system for providing power to the electronic device.

12. The mounting device as set forth in claim 7, wherein the mounting device includes at least three solar cells.

13. A mounting device for removably supporting an electronic device on a surface, the mounting device comprising:
- a flexible base for placement on the surface, the base including at least two independently moveable appendages, wherein the base is operable to maintain its position on the surface primarily using frictional forces and requires no suction cups, adhesives, or fasteners to adhere to the surface;
- an attachment mechanism positioned on top the base for removably coupling with the electronic device;
- a battery system including a rechargeable battery positioned within the base;
- an electrical connector operable to electrically couple the battery system to the electronic device for providing power to the electronic device; and
- at least two solar cells positioned on or incorporated into the appendages of the base for charging the rechargeable battery.

14. The mounting device as set forth in claim 13, the base comprising an outer shell filled with weights.

15. The mounting device as set forth in claim 13, wherein the attachment mechanism includes a hinge anchor and a mounting arm hingedly coupled with the hinge anchor.

16. The mounting device as set forth in claim 15, wherein a distal end of the mounting arm includes a ball mount for receipt within a corresponding socket on the electronic device or a socket assembly associated with the electronic device.

* * * * *